United States Patent
Mola et al.

(10) Patent No.: US 10,198,341 B2
(45) Date of Patent: Feb. 5, 2019

(54) PARALLEL REPLAY OF EXECUTABLE CODE

(71) Applicant: MICROSOFT TECHNOLOGY LICENSING, LLC, Redmond, WA (US)

(72) Inventors: Jordi Mola, Bellevue, WA (US); Juan Carlos Arevalo Baeza, Bellevue, WA (US); Darek Josip Mihocka, Bellevue, WA (US); Ivette Carreras, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 114 days.

(21) Appl. No.: 15/387,085

(22) Filed: Dec. 21, 2016

(65) Prior Publication Data
US 2018/0173611 A1 Jun. 21, 2018

(51) Int. Cl.
G06F 9/44 (2018.01)
G06F 9/45 (2006.01)
G06F 11/36 (2006.01)

(52) U.S. Cl.
CPC ........ *G06F 11/3636* (2013.01); *G06F 11/362* (2013.01)

(58) Field of Classification Search
CPC ............ G06F 11/362; G06F 11/3636–11/3664
See application file for complete search history.

(56) References Cited

U.S. PATENT DOCUMENTS

| 5,870,607 A * | 2/1999 | Netzer ................ G06F 11/3414 |
| | | 714/E11.193 |
| 6,101,524 A | 8/2000 | Choi et al. |

(Continued)

FOREIGN PATENT DOCUMENTS

| SE | 524799 C2 | 10/2004 |
| WO | 2014158151 A1 | 10/2014 |

OTHER PUBLICATIONS

Daniel Becker, Replay-based synchronization of timestamps in event traces of massively parallel applications, 2008, pp. 213-219. https://ieeexplore.ieee.org/stamp/stamp.jsp?tp=&arnumber=4626803 (Year: 2008).*

(Continued)

*Primary Examiner* — Mongbao Nguyen
(74) *Attorney, Agent, or Firm* — Workman Nydegger

(57) ABSTRACT

Embodiments herein are directed to parallel replay of code execution. An embodiment parses trace data comprising a plurality of trace data streams that each represents execution of a corresponding one of a plurality of executable entities, and identifies a plurality of trace sections that each represents one or more events executed by one of the executable entities over a period of time. The embodiment defines an ordering among the trace sections, identifies a point of interest in at least one of the executable entities, and identifies a subset of the trace sections that, when replayed linearly according to the ordering, would encounter the point of interest. The embodiment queues the subset of trace sections in an execution pool for replay by one or more processors. Then, based on the trace data, the embodiment uses the processor(s) to replay two or more of the subset of trace sections in parallel.

18 Claims, 4 Drawing Sheets

(56) References Cited

U.S. PATENT DOCUMENTS

| | | | |
|---|---|---|---|
| 6,516,460 | B1 | 2/2003 | Merks et al. |
| 6,681,384 | B1 | 1/2004 | Bates et al. |
| 6,769,054 | B1* | 7/2004 | Sahin .................. G06F 11/3466 711/162 |
| 6,775,826 | B1* | 8/2004 | Zahavi ................ G06F 11/3034 710/18 |
| 8,352,907 | B2* | 1/2013 | Kettley ................. G06F 11/366 717/106 |
| 8,769,518 | B1* | 7/2014 | Daudel .................. G06F 9/455 717/166 |
| 2007/0168989 | A1* | 7/2007 | Edwards ............ G06F 11/3636 717/127 |
| 2009/0248611 | A1* | 10/2009 | Xu ...................... G06F 9/45533 |
| 2010/0251031 | A1* | 9/2010 | Nieh ................... G06F 11/3419 714/45 |
| 2011/0320877 | A1* | 12/2011 | Devarajan ........... G06F 11/3636 714/38.1 |
| 2012/0030657 | A1* | 2/2012 | Gao ........................ G06F 9/524 717/128 |
| 2012/0185430 | A1* | 7/2012 | Yao ..................... G06F 11/3414 707/617 |
| 2012/0310985 | A1* | 12/2012 | Gale ................. G06F 17/30578 707/792 |
| 2013/0117236 | A1* | 5/2013 | Schreter ............ G06F 17/30356 707/682 |
| 2014/0089642 | A1* | 3/2014 | Gottschlich ......... G06F 11/3664 712/220 |
| 2014/0237293 | A1* | 8/2014 | Cui .................... G06F 11/3466 714/37 |
| 2014/0337822 | A1* | 11/2014 | Puthuff .............. G06F 11/3636 717/125 |
| 2015/0355996 | A1* | 12/2015 | Smith ................. G06F 11/3636 717/128 |
| 2016/0246465 | A1* | 8/2016 | Nguyen .............. G06F 11/3414 |
| 2016/0292061 | A1* | 10/2016 | Marron .................. G06F 11/362 |
| 2016/0335172 | A1 | 11/2016 | Smith et al. |

OTHER PUBLICATIONS

Kaushik Veeraraghavan, Doubleplay: Parallizing Sequential Logging and Replay, 2011, pp. 1-11. http://web.eecs.unnich.edu/~nsatish/papers/ASPLOS-11-DoublePlay.pdf (Year: 2011).*

Vedavyas Duggirala, Open Network Emulator: A Parallel Direct Code Execution Network Simulator, 2012, pp. 101-109. https://ieeexplore.ieee.org/stamp/stamp.jsp?tp=&arnumber=6305896 (Year: 2012).*

Michael Noeth, Scalable Compression and Replay of Communication Traces in Massively Parallel Environments, 2007, pp. 1-11. http://moss.csc.ncsu.edu/~mueller/ftp/pub/mueller/papers/ipdps07.pdf (Year: 2007).*

"Undo: documentation", http://undo.io/docs/TechnicalDetails.html, Retrieved on: Feb. 8, 2017, 3 pages.

Sankova, Aliaksandra, "Record and Replay of Multithreaded Applications", http://www.gsd.inesc-id.pt/~ler/reports/asankova-midterm.pdf, Retrieved on: Feb. 8, 2017, 1-21 pages.

Honarmand, et al., "Cyrus: unintrusive application-level record-replay for replay parallelism", In Proceedings of the eighteenth international conference on Architectural support for programming languages and operating systems, Mar. 16, 2013, pp. 193-206.

Mesnier, et al., "TRACE: Parallel trace replay with approximate causal events", In Proceedings of the 5th USENIX Conference on File and Storage Technologies, Feb. 13, 2007, 15 pages.

"Microsoft Debug Multithreaded Applications in Visual Studio", https://msdn.microsoft.com/en-us/library/ms164746.aspx, Published on: Feb. 15, 2009, 3 pages.

Geels, et al., "Replay Debugging for Distributed Applications", In Proceedings of the annual conference on USENIX, May 30, 2006, pp. 289-300.

Drebes, et al., "Aftermath: A graphical tool for performance analysis and debugging of fine-grained task-parallel programs and run-time systems", In 7th Workshop on Programmability Issues for Heterogeneous Multicores, Jan. 22, 2014, pp. 1-13.

* cited by examiner

PARALLEL REPLAY OF EXECUTABLE CODE

BACKGROUND

When writing code during the development of software applications, developers commonly spend a significant amount of time "debugging" the code to find runtime errors in the code. In doing so, developers may take several approaches to reproduce and localize a source code bug, such as observing behavior of a program based on different inputs, inserting debugging code (e.g., to print variable values, to track branches of execution, etc.), temporarily removing code portions, etc. Tracking down runtime errors to pinpoint code bugs can occupy a significant portion of application development time.

Many types of debugging applications ("debuggers") have been developed in order to assist developers with the code debugging process. Many such tools offer developers the ability to trace, visualize, and alter the execution of computer code. For example, debuggers may visualize the execution of code instructions, may present variable values at various times during code execution, may enable developers to alter code execution paths, and/or may enable developers to set "breakpoints" in code (which, when reached during execution, causes execution of the code to be suspended), among other things.

An emerging form of debugging applications enable "time travel," "reverse," or "historic" debugging, in which execution of a program is recorded/traced by a trace application into one or more trace files, which can be then be used to replay execution of the program for forward and backward analysis. For example, time travel debuggers can enable a developer to set forward breakpoints (like conventional debuggers) as well as reverse breakpoints. However, to ensure correctness of trace data, these conventional time travel debuggers enforce restrictions in which program code be traced as if it were single-threaded and executing on a single processor—even if the code was written to be multi-threaded. This, in turn, leads to slow replay performance of these traces, since replay is likewise single-threaded.

BRIEF SUMMARY

At least some embodiments described herein leverage traces that include data streams that record a trace of a different executable entity (e.g., thread) independently, in order to enable parallel replay of the executable entities. Leveraging these traces provides for fast replay performance, since sections of the trace can be replayed, in parallel, on a plurality of processing units. Thus, a computer system is enabled to provide results in a debugging session much more quickly than conventional time travel debuggers. For example, in many circumstances the embodiments described herein can enable a time travel debugger to replay multiple sections of multiple trace data streams in parallel, in order to locate a specified breakpoint quickly enough (e.g., within 50 milliseconds) that the duration of the replay is imperceptible to a human user.

Some embodiments are directed to methods, systems, and/or computer program products for performing a parallel replay of code execution. Trace data is parsed. The trace data comprises a plurality of trace data streams that each represents execution of a corresponding one of a plurality of executable entities. The parsing includes identifying, from the plurality of trace data streams, a plurality of trace sections from among the plurality of trace data streams. Each trace section represents one or more events executed by one of the executable entities over a period of time. An ordering among the plurality of trace sections is defined, and a point of interest in at least one of the plurality of executable entities is identified. A subset of the plurality of trace sections are identified that, when replayed linearly according to the ordering, would encounter the point of interest. The subset of the plurality of trace sections are queued in an execution pool for replay by one or more processors, and the processor(s) use the trace data to replay two or more of the subset of the plurality of trace sections in parallel.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

At least some embodiments described herein leverage traces that include data streams that record a trace of a different executable entity (e.g., thread) independently, in order to enable parallel replay of the executable entities. Leveraging these traces provides for fast replay performance, since sections of the trace can be replayed, in parallel, on a plurality of processing units. Thus, a computer system is enabled to provide results in a debugging session much more quickly than conventional time travel debuggers. For example, in many circumstances the embodiments described herein can enable a time travel debugger to replay multiple sections of multiple trace data streams in parallel, in order to locate a specified breakpoint quickly enough (e.g., within 50 milliseconds) that the duration of the replay is imperceptible to a human user.

Figure 1:
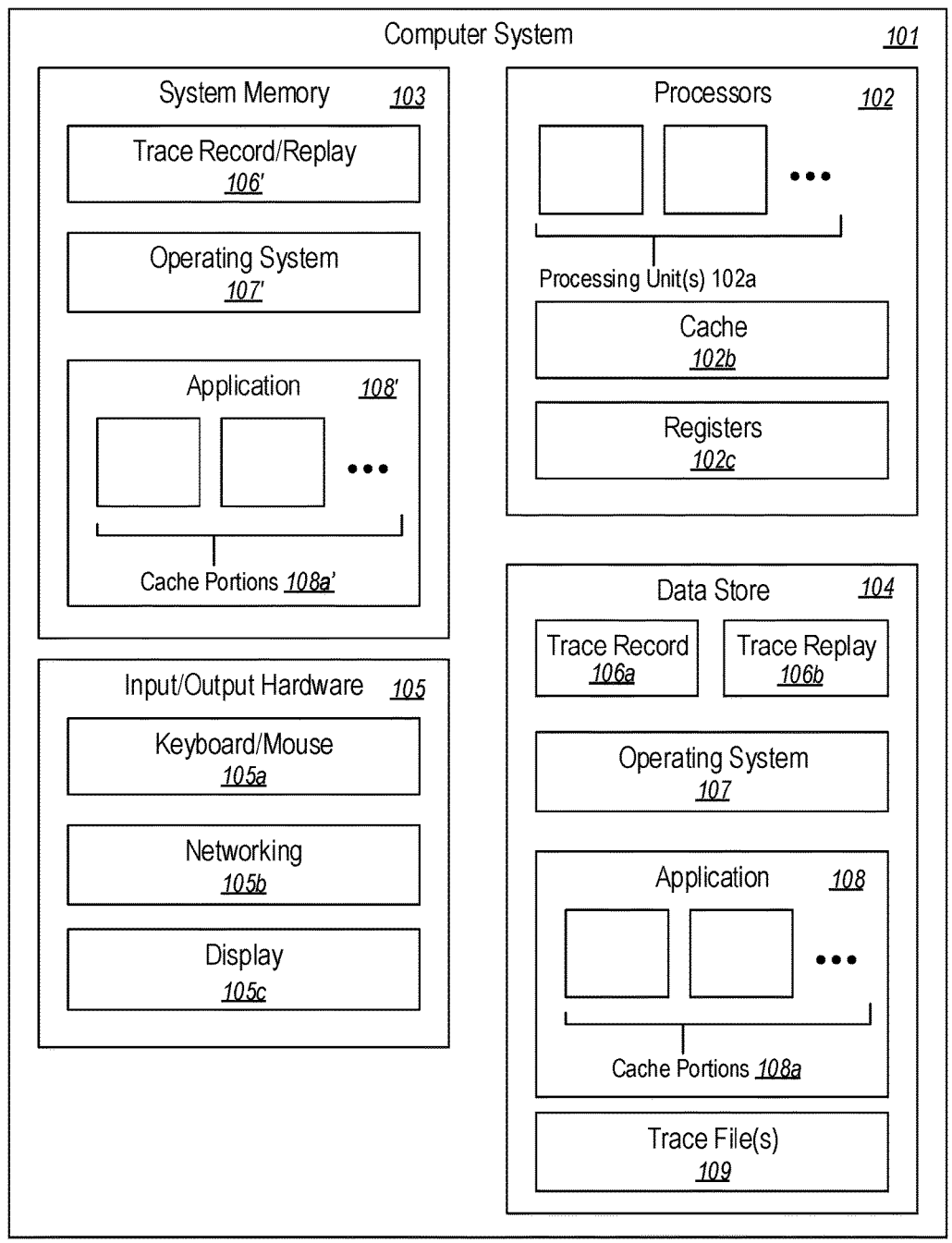
FIG. 1 illustrates an example computing environment that facilitates parallel replay of program code.

To the accomplishment of the foregoing, FIG. 1 illustrates an example computing environment 100 that facilitates parallel replay of program code. As depicted, embodiments may comprise or utilize a special-purpose or general-purpose computer system 101 that includes computer hardware, such as, for example, one or more processors 102, system memory 103, one or more data stores 104, and/or input/ output hardware 105 (e.g., such as depicted keyboard/mouse hardware 105a, networking hardware 105b, and display device 105c).

Embodiments within the scope of the present invention include physical and other computer-readable media for carrying or storing computer-executable instructions and/or data structures. Such computer-readable media can be any available media that can be accessed by the computer system 101. Computer-readable media that store computer-executable instructions and/or data structures are computer storage devices. Computer-readable media that carry computer-executable instructions and/or data structures are transmission media. Thus, by way of example, and not limitation, embodiments of the invention can comprise at least two distinctly different kinds of computer-readable media: computer storage devices and transmission media.

Computer storage devices are physical hardware devices that store computer-executable instructions and/or data structures. Computer storage devices include various computer hardware, such as RAM, ROM, EEPROM, solid state drives ("SSDs"), flash memory, phase-change memory ("PCM"), optical disk storage, magnetic disk storage or other magnetic storage devices, or any other hardware device(s) which can be used to store program code in the form of computer-executable instructions or data structures, and which can be accessed and executed by the computer system 101 to implement the disclosed functionality of the invention. Thus, for example, computer storage devices may include the depicted system memory 103, the depicted data store 104 which can store computer-executable instructions and/or data structures, or other storage such as on-processor storage, as discussed later.

Transmission media can include a network and/or data links which can be used to carry program code in the form of computer-executable instructions or data structures, and which can be accessed by the computer system 101. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media. For example, the input/output hardware 105 may comprise networking hardware 105b (e.g., a hard-wired or wireless network interface module) that connects a network and/or data link that can be used to carry program code in the form of computer-executable instructions or data structures.

Further, upon reaching various computer system components, program code in the form of computer-executable instructions or data structures can be transferred automatically from transmission media to computer storage devices (or vice versa). For example, computer-executable instructions or data structures received over a network or data link can be buffered in RAM within networking hardware 105b, and then eventually transferred to the system memory 103 and/or to less volatile computer storage devices (e.g., data store 104) at the computer system 101. Thus, it should be understood that computer storage devices can be included in computer system components that also (or even primarily) utilize transmission media.

Computer-executable instructions comprise, for example, instructions and data which, when executed at the processor(s) 102, cause the computer system 101 to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

As illustrated, the data store 104 can store computer-executable instructions and/or data structures representing application code such as, for example, a trace record component 106a, a trace replay component 106b, an operating system 107, and an application 108 including portions of executable code 108a. The data store 104 can also store other types of data, such as one or more trace file(s) 109. When application code is executing (e.g., using the processor(s) 102), the system memory 103 can store corresponding runtime data, such as runtime data structures, computer-executable instructions, etc. Thus, FIG. 1 illustrates the system memory 103 as including runtime record/replay data 106', runtime operating system data 107', and runtime application data 108a' (runtime executable code data 108a').

The trace record component 106a is usable to trace execution of an application, such as application 108 including its executable code portions 108a, and to store trace data in the trace file(s) 109. In some embodiments, the trace record component 106a is a standalone application, while in other embodiments it is integrated into another software component, such as the operating system 107, a hypervisor, etc. The trace record component 106a may also exist at an entirely different computer system. Thus, the trace record component 106a may trace execution of code at another computer system. Then, the trace file(s) 109 resulting from that tracing can be transferred (e.g., using the networking hardware 105b) to the computer system 101 for replay be the trace replay component 106b. While the trace file(s) 109 are depicted as being stored in the data store 104, they may also be recorded exclusively or temporarily in the system memory 103, or at some other storage device.

FIG. 1 also includes a simplified representation of the internal hardware components of the processor(s) 102. As illustrated, each processor 102 includes a plurality of processing units 102a. Each processing unit may be physical (i.e., a physical processor core) and/or logical (i.e., a logical core presented by a physical core that supports hyper-threading, in which more than one application thread executes at the physical core). Thus, for example, even though the processor 102 may in some embodiments include only a single physical processing unit (core), it could include two or more processing units 102a presented by that single physical processing unit.

Each processing unit 102a executes processor instructions that are defined by applications (e.g., trace record component 106a, trace replay component 106b, operating system 107, application 108, etc.), and which instructions are selected from among a predefined processor instruction set architecture. The particular instruction set architecture of each processor 102 varies based on processor manufacturer and processor model. Common instruction set architectures include the IA-64 and IA-32 architectures from INTEL, INC., the AMD64 architecture from ADVANCED MICRO DEVICES, INC., and various Advanced RISC Machine ("ARM") architectures from ARM HOLDINGS, PLC, although a great number of other instruction set architectures exist and can be used by the present invention. In general, an "instruction" is the smallest externally-visible (i.e., external to the processor) unit of code that is executable by a processor.

Each processing unit 102a obtains processor instructions from a shared processor cache 102b (i.e., shared by the processing units 102a), and executes the processor instructions based on data in the shared cache 102a, based on data in registers 102c, and/or without input data. In general, the shared cache 102b is a small amount (i.e., small relative to the typical amount of system memory 103) of random-access memory that stores on-processor copies of portions of the system memory 103. For example, when executing the executable code portions 108b, the shared cache 102b contains portions of the runtime executable code data 108b'. If the processing unit(s) 102a require data not already stored in the shared cache 102b, then a "cache miss" occurs, and that data is fetched from the system memory 103 (potentially evicting some other data from the shared cache 102b). The registers 102c are hardware based storage locations that are defined based on the instruction set architecture of the processors(s) 102.

Figure 2:
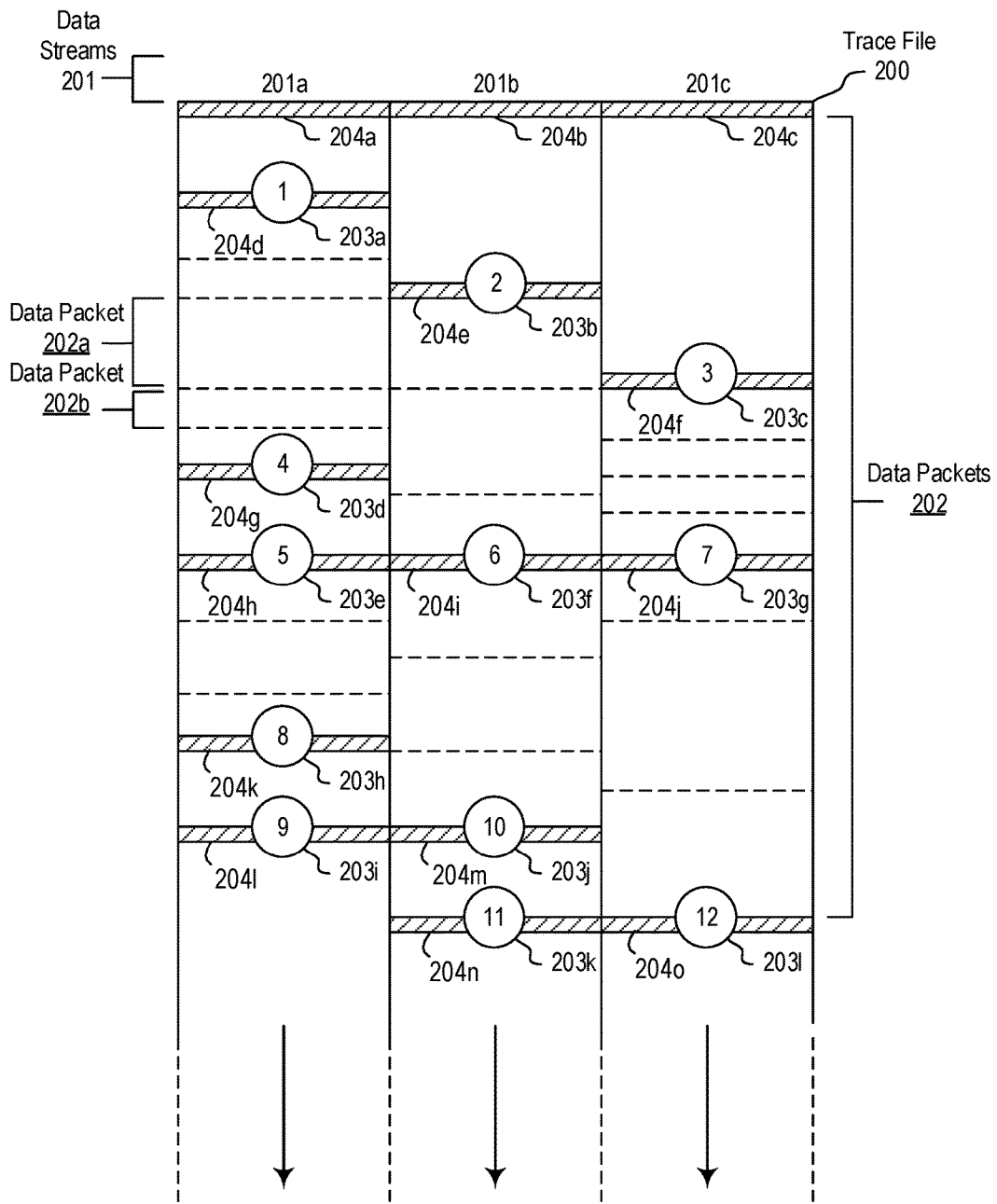
FIG. 2 illustrates an example trace file.

As mentioned above, to perform a parallel replay, embodiments leverage trace files—recorded by the trace record component 106a—which include independently recorded data streams for different executable entities, such as different threads of execution of one or more code portions 108a of application 108. For example, FIG. 2 illustrates an example trace file 200 (e.g., corresponding to the trace file(s) 109 of FIG. 1) generated by the trace record component 106a. During execution of an application (e.g., application 108), the trace record component 106a records a separate data stream 201 in the trace file 200 for each processing unit 102a—and thus for each executable entity of the application (e.g., different threads, different executable entities corresponding to different portions of executable code 108a of the application 108, etc.). The example trace file 200 includes three data streams 201a-201c (and thus would correspond to three processing units executing three different executable entities), but the trace file 200 could include any number of data streams 201 depending on a number of processing units 102a available at the computer system 101 (whether they be in a single processor 102 or multiple processors 102) and/or a number of executable entities created by the application 108.

The data streams 201 may be included in a single file, or may each be stored in different files. Each data stream 201 includes data packets 202 storing trace data that is usable by the trace replay component 106b to reproduce execution of the corresponding executable entity, by supplying appropriate recorded state data (e.g., register values, memory addresses and values, etc.) to executable code of the executable entity at appropriate times. Thus, using the information in the data streams 201, and using the actual executable code whose execution was traced, a full reproduction of execution of that code can be reproduced.

In FIG. 2, the data packets 202 are depicted as being separated by broken lines. Thus, for example, two of the data packets in data stream 201a are identified as data packets 202a and 202b. As depicted, individual data packets 202 may be of differing sizes, depending on trace file implementation and on the particular data stored in each packet. Example data that may be included in a data packet includes information for identifying a code instruction executed, register values provided to that code instruction, memory addresses/values read, the side effects (e.g., resulting register values) of executing the code instruction, etc.

As mentioned, the trace record component 106a records each data stream 201 independently during execution of the code being traced, such that the timing of the executable events recorded by the trace record component 106a into data packets in one data stream is generally independent from the timing of the events recorded by the trace recoding component 106a into data packets in another data stream. Thus, the replay component 106b can generally replay each data stream 201 independently. However, the trace file 200 also stores sequencing events that record the timing and sequence of execution of certain events that are "orderable" across the data streams 201. In some embodiments, these orderable events are recorded using a sequencing number, comprising a monotonically incrementing number ("MIN"), which is guaranteed not to repeat. For example, the trace file 200 of FIG. 2 includes twelve sequencing numbers 203a-203l, each corresponding to the occurrence of different orderable events across data streams 201a-201c. Sequencing numbers (and the events they represent) may be recorded in a data packet 202, or may be recorded separately.

Orderable events may be defined according to a "trace memory model," which is used to identify how to store interactions across executable entities, such as threads (e.g., based on how the threads interact through shared memory, their shared use of data in the shared memory, etc.). Depending on implementation, a trace memory model may be weaker or stronger than a memory model used by the processor 102. The trace memory model used may be a memory model defined by a programming language used to compile code (e.g., C++14), or some other memory model defined for purposes of tracing.

As depicted, the trace file 200 can also include key frames (e.g., key frames 204a-204o). A key frame is a type of data packet that stores sufficient information to replay execution of an executable entity from the time of the key frame onward. For example, a key frame may store values for all relevant processor registers, information necessary to reproduce memory values from that point onward, etc. In FIG. 2, there is a key frame at the beginning of each trace data stream 201 (i.e., key frames 204a-204c). Key frames 204a-204c may represent state at the beginning of execution of each executable entity. While not expressly depicted, it is noted that any number of key frames may be saved at any point in a data stream 201, and need not occur at the same time across data streams. Thus, using key frames 204, the trace replay component 106b is enabled to initiate replay of each trace data stream 201 at various points. As discussed later, using key frames and/or orderable events, initiation of replay of different trace data streams can be performed in parallel. While not necessary, in some embodiments, a key frame may be stored in connection with the occurrence of each orderable event (e.g., key frames 204d-204o).

Figure 3:
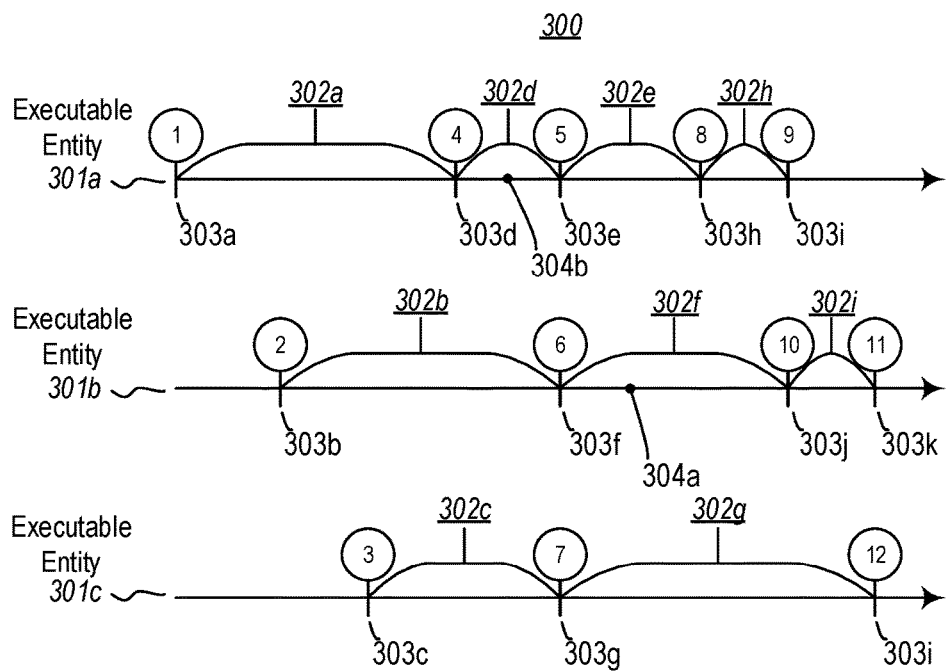
FIG. 3 illustrates example timing diagram of execution of the executable entities recorded in the trace file of FIG. 2.

FIG. 3 illustrates an example timing diagram 300 of execution of the executable entities recorded in the trace file 200 of FIG. 2. Thus, for example, FIG. 3 illustrates a timeline of execution of executable entity 301a as recorded by data stream 201a, a timeline of execution of executable entity 301b as recorded by data stream 201b, and a timeline of execution of executable entity 301c as recorded by data stream 201c. In these timelines, the timing diagram 300 also represents the occurrence of orderable events 303a-303l corresponding to the twelve orderable events 203a-203l of FIG. 2. Using orderable events 303a-303l, different sections of traced executable events of the corresponding executable entity can be identified.

For example, based on the trace data of data stream 201a, the timing diagram 300 represents that executable entity 301a executed a section 302a of executable events between sequencing number one (303a) and sequencing number four (303d), a section 302d of executable events between sequencing number four (303d) and sequencing number five (303e), and sections 302e and 302h of executable events between sequencing numbers five (303e), eight (303h), and nine (303i). Similarly, based on the trace data of data stream 201b, the timing diagram 300 represents that executable entity 301b executed sections 302b, 302f, and 302i of executable events between sequencing numbers two (303b), six (303f), ten (303j), and eleven (303k). Finally, based on the trace data of data stream 201c, the timing diagram 300 represents that executable entity 301c executed sections 302c and 302g of executable events between sequencing numbers three (303c), seven (303g), and twelve (303l).

A partial ordering of executable events can be identified using the timing diagram 300, based on the sequencing numbers 303a-303l and/or any key frames. For example, based on sequencing numbers 303a-303l it is known that, at trace time, the executable events in section 302a executed prior to the executable events in sections 302d-302g. However, since the different executable entities 301a-301b were executed and traced independently, the particular order in which individual events in sections 302a-302c executed relative to one another at trace time is not known. Since the different executable entities 301a-301b were executed and traced independently, and if a key frame was saved in connection with each sequencing number, the sections 302d-302g of traced events for different executable entities can be replayed in parallel. For example, executable events in section 302a of executable entity 301a can be executed in parallel with executable events in sections 302b and 302c of executable entities 301b and 301c.

Additionally, with the use of key frames recorded at the beginning of each trace and periodically throughout each trace, sections of traced events for the same executable entity can also be replayed in parallel. Thus, assuming in this example that a key frame was saved in connection with each sequencing number, then each section within a single executable entity can also replayed in parallel. For example, sections 302a, 302d, 302e, and 302h of executable entity 301a can all be executed in parallel with each other, since a key frame at each orderable event enables the trace replay component 106b to initiate replay at the beginning of each section. Note that key frames need not only be saved at orderable events, and that any number of key frames can be saved at any time for an executable entity. The addition of more key frames can therefore provide additional sections and, by extension, an even greater level of parallelization.

Embodiments include defining an overall linear ordering among the executable events, for applying a linear execution logic during replay, and for queuing sections for replay. In some embodiments, this ordering is defined at the section level. While this ordering may not correspond to the actual order in which events executed at trace time, results of execution of each section can be combined to determine, for any point in execution, the precise program state that occurred at trace time. For example, one embodiment may order sections 302a-302i based on the order of occurrence of sequencing numbers and/or key frames. In this embodiment, the sections 302a-302i may be defined an order of: 302a, 302b, 302c, 302d, 302e, 302f, 302g, 302h, and 302i.

Defining an ordering ensures a fixed logical order of replay (even if individual sections are replayed in parallel or out of order, as discussed below) guaranteeing that, irrespective of how the trace replay component 106b arrives at given point in the execution (e.g., whether it performed a forward replay or a backwards replay to arrive at a breakpoint), the view of recorded program state is always the same. While the defined ordering does not have to be the order in which execution actually occurred during trace time, needs to a be a valid order of execution.

Independently recorded traces, combined with orderable events saved in those traces with sequencing numbers, enables for sections of different executable entities can be replayed in parallel, even if those two entities did not originally execute in parallel. For example, sections of different threads or processes can be replayed in parallel, even if those threads/processes originally executed at a single processing unit 102a or were originally executed at different times. The further addition of key frames also enables sections within the same executable entity to be replayed in parallel. Thus, two levels of parallelization are enabled: sections of different executable units can be replayed in parallel, and sections of the same executable units can also be replayed in parallel.

Parallel replay of sections of a trace across multiple processing units provides for responsive replay/traversal of trace data during a debugging session. For example, suppose that a point of interest (e.g., a breakpoint on a variable, a function, etc.) were to be specified by a user in a debugging application that is replaying the trace file 200, which includes a trace of execution of code of application 108 (e.g., a debugging application which utilizes trace replay component 106b). Further, suppose that each trace data stream 201 traces a different thread of that code's execution. Each executable entity 301a-301c then corresponds to one of those threads. The debugging application, using the trace replay component 106b, can then perform a parallel replay of different sections 302a-302i to identify points in the traced execution in which the breakpoint is encountered, and to present a global view of program state at the time of the breakpoint.

For example, suppose that the debugging application receives a breakpoint that would "hit" at executable event 304a, because, for example, a variable specified in the debugging application that is accessed by that executable event, or the executable event corresponds to a line of source code specified in the debugging application. In order to obtain a full view of program state at the time of executable event 304a, the replay component 106b uses the defined ordering of sections 302a-302i to determine which sections, if replayed linearly according to the ordering, would encounter the breakpoint. For example, the replay component 106b may determine that sections 302a-302g should be queued for replay. The replay component 106b then queues sections 302a-302g to an execution pool, for replay by one or more processing units (e.g., processors 102, and/or processing units at another computer system). In doing so, the replay component 106b can cause the processing unit(s) to replay at least a subset of those sections in parallel. When the breakpoint is encountered (i.e., "hit") during replay of section 302f, the replay component 106b can present the appropriate program state (e.g., register values, memory values, etc.) at that point in time.

Often times, the replay component 106b may encounter multiple hits on a breakpoint, both in different sections of executable events, and on different executable entities. For example, the breakpoint may correspond to a frequently accessed variable, or a line of source code that is part of a loop or a frequently accessed function. When this happens, the replay component 106b can choose which "hit" to present to a user, based on the chosen ordering of sections. For example, if a breakpoint were encountered at both executable event 304a in section 302f and executable event 304b in section 302d, the replay component 106b can filter out executable event 304a, since it occurs after executable event 304b, and present the appropriate program state at executable event 304b.

Additionally, the replay component 106b can apply filters to intelligently refrain from replaying some sections. For example, suppose that sections 302a-302g were chosen for replay, and that section 303d were replayed prior to section 303f, encountering the breakpoint at executable event 304b. Since section 303f occurs after section 303d in the defined ordering, and since the breakpoint already hit in section 302d, the replay component 106b could remove section 302f from the execution pool. While, in some situations, subsequent sections may be removed the execution pool when a breakpoint is encountered, prior sections may still need to be replayed. For example, if section 303d were replayed prior to section 302a (due to the parallelized replay of the sections) and encounters the breakpoint at executable event 304b, the replay component 106b would still need to replay section 302a to determine if the breakpoint is encountered in that section.

Figure 4:
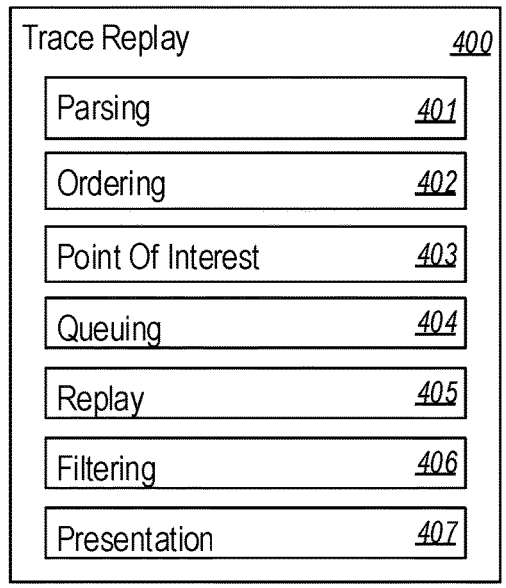
FIG. 4 illustrates details of an example trace replay component.

In accordance with the foregoing, FIG. 4 illustrates details of an example trace replay component 400, such as trace replay component 106b of FIG. 1. As depicted in FIG. 4, the trace replay component 400 can include a number of sub-components, such as, for example, a parsing component 401, an ordering component 402, a point of interest component 403, and queuing component 404, a replay component 405, a filtering component 406, and/or a presentation component 407. One of ordinary skill in the art will recognize that the particular identity and number of these sub-components can vary based on implementation.

The parsing component 401 is configured to parse trace files 109, such as trace file 200, in order to identify data streams 201 that each correspond to a different executable entity (e.g., 301a-301c). Thus, for example, the parsing component can identify data streams 201a-201b. Based on the information recorded in the data streams (e.g., data packets, key frames, and sequencing numbers), the parsing component can identify a plurality of sections (e.g., 302a-302i) of executable events among the different executable entities.

After parsing, the ordering component 402 is configured to identify an ordering among the identified trace sections. For example, the ordering component may order the sections based on an order of occurrence of sequencing numbers 303a-303l and/or key frames in and among the data streams 201.

The point of interest component 403 is configured to identify a point of interest, such as a breakpoint, in the executable entities 301a-301c. For example, the point of interest may be a user-specified variable, function, line of source code, executable instruction, etc. Based on the identified point of interest, the queuing component 404 is configured to identify trace sections that, when replayed linearly according to the defined ordering, would encounter the point of interest. The queuing component 404 can then queue those section for a parallel execution across one or more processing units.

Once trace sections are queued, the replay component 405 is configured to use the data in the trace data streams 201, together with the code of the executable entities 301a-301c, to replay execution of each section. In particular, the replay component 405 replays execution of the code of each executable entity, while supplying that code with runtime data, such as register and memory values, from the trace data streams. Due to the independent nature of the trace data streams 201, sections from the traces of different executable entities can be replayed in parallel. Furthermore, due to key frames, sections from the traces of the same executable entity can also be replayed in parallel.

Based on the replay by the replay component 405, the filtering component 406 is configured to identify when desired breakpoints are hit, and filter those hits to identify the hit that occurred first based on the defined ordering. Furthermore, the filtering component 406 is configured to determine when it is no longer necessary to replay queued sections, and to remove them from the queue.

The presentation component 407 is configured to present the identified breakpoint at a display device, including, for example, presenting program state such as register values, memory values, etc. at the time of the breakpoint.

Figure 5:
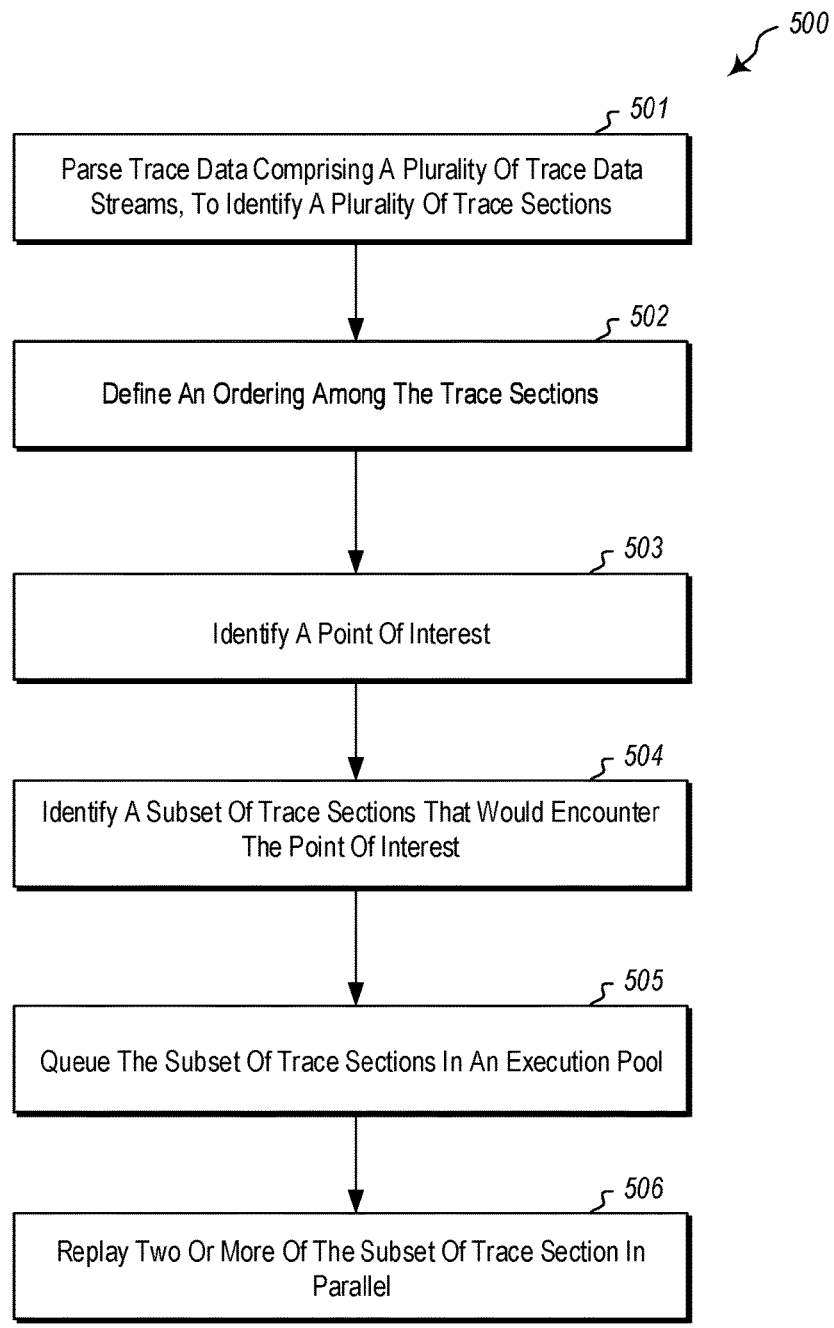
FIG. 5 illustrates a flowchart of an example method for performing a parallel replay of code execution.

In accordance with the foregoing, FIG. 5 illustrates an example of a method 500 for performing a parallel replay of code execution. FIG. 5 is described in connection with the components and data described in connection with FIG. 1-4. The particular ordering of the acts in the method 500 is not limited to the ordering shown.

As illustrated, method 500 includes an act 501 of parsing trace data comprising a plurality of trace data streams, to identify a plurality of trace sections. Act 501 can comprise parsing trace data comprising a plurality of trace data streams that each represents execution of a corresponding one of a plurality of executable entities, including identifying, from the plurality of trace data streams, a plurality of trace sections from among the plurality of trace data streams, each trace section representing one or more events executed by one of the executable entities over a period of time. For example, the parsing component 401 can parse a trace file 200 comprising a plurality of data streams 201 that each represent execution of a different executable entity (e.g., a thread of application 108). Additionally, the parsing component 401 can identify sections of executable events in each data stream, such as sections 302a-302i of FIG. 3.

In some embodiments, the plurality of trace data streams data define a plurality of orderable events occurring across the plurality of executable entities, in which each orderable event represents the occurrence of an event in a corresponding executable entity that is orderable in relation to others of the plurality of orderable events. For example, the trace file 200 can define orderable events 203a-203l. In such embodiments, the parsing component 401 may identify the plurality of trace sections based at least on the plurality of orderable events 203a-203l, with each trace section comprising executable events occurring between two orderable events on each executable entity.

In additional or alternative embodiments, the plurality of trace data streams define a plurality of key frames that each contains information allowing replay of a corresponding executable entity starting at the key frame. For example, the trace file 200 can define key frames 204a-204o. In such embodiments, the parsing component 401 may identify the plurality of trace sections based at least on the plurality of key frames 204a-204o, with each trace section comprising executable events occurring between two key frames on each executable entity.

Method 500 also includes an act 502 of defining an ordering among the trace sections. Act 502 can comprise defining an ordering among the plurality of trace sections. For example, the ordering component 402 can identify an ordering among trace sections 302a-302i. For example, the ordering component may order sections 302a-302i based on an order of occurrence of sequencing numbers 303a-303l and/or key frames in and among the data streams 201. In an example, the trace sections 302a-302i of FIG. 3 may be ordered as: 302a, 302b, 302c, 302d, 302e, 302f, 302g, 302h, and 302i.

Method 500 also includes an act 503 of identifying a point of interest. Act 503 can comprise identifying a point of interest in at least one of the plurality of executable entities. For example, the point of interest component 403 may receive a user-specified point of interest (e.g., through a debugging application), which may comprise a breakpoint in source code. The breakpoint may specify a variable, a function, a line of source code, an executable instruction, etc. to be located in the trace.

Method 500 also includes an act 504 of identifying a subset of trace sections that would encounter the point of interest, and an act 505 of queuing the subset of trace sections in an execution pool. Act 504 can comprise identifying a subset of the plurality of trace sections that, when replayed linearly according to the ordering, would encounter the point of interest. Act 505 can comprise queuing the subset of the plurality of trace sections in an execution pool for replay by the one or more processors. For example, the queuing component 404 may identify trace sections that, when replayed linearly according to the defined ordering, would encounter the point of interest. The queuing component 404 can then queue those section for a parallel execution across one or more processing units.

Method 500 also includes an act 506 of replaying two or more of the subset of trace sections in parallel. Act 506 can comprise replaying, by the one or more processors, and based on the trace data, two or more of the subset of the plurality of trace sections in parallel. For example, the replay component 405 can replay each queued trace section for replay across processing units 102. Replay can comprise executing code of the corresponding executable entity, while supplying that code with state data (e.g., register values, memory addresses and values, etc.) from the trace file 200.

While replay can include replaying queued trace sections using the processing units 102 at computer system 101, replay can additionally or alternatively include replaying the queued trace sections across processing units not part of computer system 101. For example, the queued trace sections can be replayed in a distributed matter across one or more other computer systems connected via one or more network links. Thus, the trace sections can be replayed in a highly parallelized matter across many processors and at many computer systems.

Method 500 may also include encountering the defined point of interest while replaying one or more of the subset of the plurality of trace sections. When this happens, the presentation component 407 can present program state data, at the time of the encounter, at a display device. In some cases, the method include, based at least on encountering the defined point of interest while replaying one or more of the subset of the plurality of trace sections, removing at least one of the subset of the plurality of executable entities from the execution pool. For example, in FIG. 3, if the point of interest is encountered at executable event 304b, and trace section 302f has not yet been replayed, the filtering component 406 can remove trace section 302f from the execution pool.

Method 500 may also include identifying a plurality of encounters with the defined point of interest while replaying the subset of the plurality of trace sections. For example, the replay component 405 may encounter both executable events 304a and 304b. In this case, the filtering component 406 can identify, based on the identified ordering among the plurality of trace sections, a particular encounter of the plurality of encounters (e.g., based on which encounter occurred earliest based on the define ordering), and the presentation component 407 can present the particular encounter at a display device.

Accordingly, the embodiments described herein enable time travel debuggers to perform parallel replay of different sections of traces of different executable entities on one or more processing units, to provide for fast replay performance. Thus, a computer system is enabled to provide results in a debugging session much more quickly than conventional time travel debuggers, and in many cases the processing time involved in reaching a breakpoint during replay is substantially unperceivable to a human user.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Embodiments of the present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method, implemented at a computer system that includes one or more processors, for performing a parallel replay of code execution, the method comprising:
    parsing trace data comprising a plurality of trace data streams, each trace data stream representing execution of a corresponding one of a plurality of executable entities, including identifying, from the plurality of trace data streams, a plurality of trace sections from among the plurality of trace data streams, each trace section representing one or more events executed by one of the executable entities over a period of time;
    defining an ordering among the plurality of trace sections;
    identifying a point of interest in at least one of the plurality of executable entities;
    identifying a subset of the plurality of trace sections that, when replayed linearly according to the ordering, would encounter the point of interest;
    queuing the subset of the plurality of trace sections in an execution pool for replay by the one or more processors;
    replaying, by the one or more processors, and based on the trace data, two or more of the subset of the plurality of trace sections in parallel;
    encountering the defined point of interest while replaying one or more of the subset of the plurality of trace sections; and
    based at least on encountering the defined point of interest, removing at least one of the subset of the plurality of trace sections from the execution pool.

2. The method as recited in claim 1, wherein the plurality of trace data streams define a plurality of orderable events occurring across the plurality of executable entities, each orderable event representing the occurrence of an event in a corresponding executable entity that is orderable in relation to others of the plurality of orderable events.

3. The method as recited in claim 2, wherein the plurality of trace sections are identified based at least on the plurality of orderable events.

4. The method as recited in claim 3, wherein one or more of the trace sections associated with an executable entity includes executable events occurring between two orderable events on the executable entity.

5. The method as recited in claim 1, wherein the plurality of trace data streams define a plurality of key frames, each key frame containing information allowing replay of a corresponding executable entity starting at the key frame.

6. The method as recited in claim 5, wherein the plurality of trace sections are identified based at least on the plurality of key frames.

7. The method as recited in claim 6, wherein one or more of the trace sections associated with an executable entity includes executable events occurring between two key frames on the executable entity.

8. The method as recited in claim 1, further comprising:
identifying a plurality of encounters with the defined point of interest while replaying the subset of the plurality of trace sections;
identifying, based on the identified ordering among the plurality of trace sections, a particular encounter of the plurality of encounters; and
presenting the particular encounter at a display device.

9. The method as recited in claim 1, wherein the point of interest comprises one or more of a variable, a function, a line of source code, or an executable instruction.

10. A computer system, comprising:
one or more processors; and
one or more computer-readable hardware storage devices having stored thereon computer-executable instructions that are executable by the one or more processors to cause the computer system to perform at least the following:
parse trace data comprising a plurality of trace data streams, each trace data stream representing execution of a corresponding one of a plurality of executable entities, to identify, from the plurality of trace data streams, a plurality of trace sections from among the plurality of trace data streams, each trace section representing one or more events executed by one of the executable entities over a period of time;
define an ordering among the plurality of trace sections;
identify a point of interest in at least one of the plurality of executable entities;
identify a subset of the plurality of trace sections that, when replayed linearly according to the ordering, would encounter the point of interest;
queue the subset of the plurality of trace sections in an execution pool for replay by the one or more processors;
replay, by the one or more processors, and based on the trace data, two or more of the subset of the plurality of trace sections in parallel;
encounter the defined point of interest while replaying one or more of the subset of the plurality of trace sections; and
based at least on encountering the defined point of interest, remove at least one of the subset of the plurality of trace sections from the execution pool.

11. The computer system of claim 10, wherein the plurality of trace data streams define a plurality of orderable events occurring across the plurality of executable entities, each orderable event representing the occurrence of an event in a corresponding executable entity that is orderable in relation to others of the plurality of orderable events.

12. The computer system of claim 11, wherein the plurality of trace sections are identified based at least on the plurality of orderable events.

13. The computer system of claim 12, wherein one or more of the trace sections associated with an executable entity includes executable events occurring between two orderable events on the executable entity.

14. The computer system of claim 10, wherein the plurality of trace data streams define a plurality of key frames, each key frame containing information allowing replay of a corresponding executable entity starting at the key frame.

15. The computer system of claim 14, wherein the plurality of trace sections are identified based at least on the plurality of key frames.

16. The computer system of claim 15, wherein one or more of the trace sections associated with an executable entity includes executable events occurring between two key frames on the executable entity.

17. The computer system of claim 10, the computer-readable media also having stored thereon computer-executable instructions that are executable by the one or more processors to cause the computer system to also perform at least the following:
identify a plurality of encounters with the defined point of interest while replaying the subset of the plurality of trace sections;
identify, based on the identified ordering among the plurality of trace sections, a particular encounter of the plurality of encounters; and
present the particular encounter at a display device.

18. A computer program product comprising one or more computer-readable hardware storage devices having stored thereon computer-executable instructions that are executable by one or more processors to cause a computer system to perform at least the following:
parse trace data comprising a plurality of trace data streams, each trace data stream representing execution of a corresponding one of a plurality of executable entities, to identify, from the plurality of trace data streams, a plurality of trace sections from among the plurality of trace data streams, each trace section representing one or more events executed by one of the executable entities over a period of time;
define an ordering among the plurality of trace sections;
identify a point of interest in at least one of the plurality of executable entities;
identify a subset of the plurality of trace sections that, when replayed linearly according to the ordering, would encounter the point of interest;
queue the subset of the plurality of trace sections in an execution pool for replay by the one or more processors;
replay, by the one or more processors, and based on the trace data, two or more of the subset of the plurality of trace sections in parallel;
encounter the defined point of interest while replaying one or more of the subset of the plurality of trace sections; and
based at least on encountering the defined point of interest, remove at least one of the subset of the plurality of trace sections from the execution pool.

* * * * *